US 8,848,777 B2

(12) United States Patent
Wang et al.

(10) Patent No.: US 8,848,777 B2
(45) Date of Patent: *Sep. 30, 2014

(54) RECEIVING APPARATUS AND METHOD FOR RECEIVING SIGNALS IN A WIRELESS COMMUNICATION SYSTEM WITH IMPROVED EQUALIZATION PERFORMANCE

(71) Applicant: Sony Corporation, Tokyo (JP)

(72) Inventors: Zhaocheng Wang, Beijing (CN); Qi Wang, Esslingen (DE)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,708

(22) Filed: Apr. 25, 2013

(65) Prior Publication Data

US 2013/0235922 A1 Sep. 12, 2013

Related U.S. Application Data

(63) Continuation of application No. 12/620,797, filed on Nov. 18, 2009, now Pat. No. 8,446,993.

(30) Foreign Application Priority Data

Nov. 28, 2008 (EP) ..................................... 08170224

(51) Int. Cl.
*H04L 27/08* (2006.01)
*H04B 3/46* (2006.01)
*H04L 25/03* (2006.01)
*H04L 25/02* (2006.01)
*H04L 27/01* (2006.01)

(52) U.S. Cl.
CPC .......... *H04L 27/01* (2013.01); *H04L 25/03159* (2013.01); *H04L 25/022* (2013.01); *H04L 25/0224* (2013.01)

USPC ............................................ 375/232; 375/345

(58) Field of Classification Search
USPC ................. 375/323, 345, 260, 316, 346, 232; 455/234.1, 296; 341/116
See application file for complete search history.

(56) References Cited

U.S. PATENT DOCUMENTS 7,012,882 B2 3/2006 Wang et al.
8,199,864 B1 * 6/2012 Kim et al. ...................... 375/350

(Continued)

FOREIGN PATENT DOCUMENTS

WO WO 2007/037656 A1 4/2007

OTHER PUBLICATIONS

"Merged proposal: New PHY Layer and Enhancement of MAC for mmWave System Proposal", Project: IEEE P802.15 Working Group for Wireless Personal Area Networks (WPANs), Nov. 13, 2007, pp. 1-89.

(Continued)

*Primary Examiner* — Khai Tran
(74) *Attorney, Agent, or Firm* — Oblon, Spivak, McClelland, Maier & Neustadt, L.L.P.

(57) ABSTRACT

Described herein is a receiving apparatus and method for receiving signals in a wireless communication system, the signals including a dedicated channel estimation sequence, including a gain control means that controls the gain of a received signal, a channel estimation means that performs a channel estimation on the basis of a dedicated channel estimation sequence included in a received signal, a gain error correction means that corrects a gain error in the result of said channel estimation caused by said gain control means on the basis of the dedicated channel estimation sequence comprised in the received signal, and an equalizing means that performs an equalization on the received signal on the basis of the gain corrected channel estimation result.

16 Claims, 2 Drawing Sheets

(56) References Cited

U.S. PATENT DOCUMENTS

Figure 1:
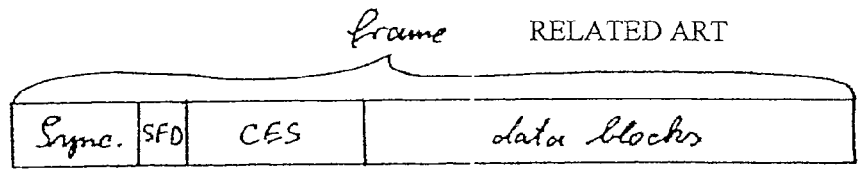

| | | |
|---|---|---|
| 8,401,125 B2 | 3/2013 | Wang et al. |
| 8,447,002 B2 | 5/2013 | Stirling-Gallacher et al. |
| 2002/0001352 A1 | 1/2002 | Stirling-Gallacher et al. |
| 2003/0058952 A1 | 3/2003 | Webster et al. |
| 2004/0161046 A1 | 8/2004 | Schott et al. |
| 2004/0229581 A1 | 11/2004 | Mizoguchi et al. |
| 2005/0265439 A1 | 12/2005 | Matsumura et al. |
| 2007/0201587 A1 | 8/2007 | Sato |
| 2007/0230603 A1 | 10/2007 | Sato |
| 2008/0232518 A1 | 9/2008 | Kim et al. |

OTHER PUBLICATIONS

David Falconer, "Wideband Wireless Access Technologies to Broadband Internet, Frequency Domain Equalization for Single-Carrier Broadband Wireless Systems", IEEE Communications Magazine, Apr. 2002, pp. 58-66.

Ming Lei, et al., "Throughput Comparison of Multi-Gbps WPAN (IEEE 802.15.3c) PHY Layer Designs under Non-Linear 60-GHz Power Amplifier", The $18^{th}$ Annual IEEE International Symposium on Personal, Indoor and Mobile Radio Communications (PIMRC'07), 2007, 5 pages.

IEEE P802.11N™/D8.0. Draft Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Enhancements for Higher Throughput, Feb. 2009, 556 pages.

\* cited by examiner

RECEIVING APPARATUS AND METHOD FOR RECEIVING SIGNALS IN A WIRELESS COMMUNICATION SYSTEM WITH IMPROVED EQUALIZATION PERFORMANCE

This application is a continuation application of, and claims the benefit of priority under 35 U.S.C. §120 from, U.S. application Ser. No. 12/620,797, filed Nov. 18, 2009, herein incorporated by reference, which claims the benefit of priority under 35 U.S.C. §119 from European Patent Application No. 08170224.3, filed Nov. 28, 2008.

The present invention relates to a receiving apparatus and a method for receiving signals in a wireless communication system. Specifically, the present invention is directed to the improvement of the equalization.

For high data rate indoor wireless systems, for example single carrier wireless systems beyond 1 Gbps, the wireless channel delay spread might be over tens of symbols, which makes the use of conventional adaptive equalizers including linear, decision feedback or maximum likelihood sequence estimation (MLSE) equalizers not recommendable. One of the reasons is that an adaptive linear equalizer including either liner or decision feedback equalizer is difficult to converge with short training periods when the wireless channel delay spread is over tens of symbols. Also, the performance of pilot aided none adaptive linear equalizers is not good and an equalizer needs a high number of taps when the wireless channel delay spread is over tens of symbols. Further, the complexity of a maximum likelihood sequence estimation or Viterbi equalizer grows exponentially with the number of symbols included in the wireless channel delay spread and becomes extremely high when the wireless channel delay spread is over tens of symbols.

One possible solution is to use a orthogonal frequency division multiplexing (OFDM) technique, which is one possibility of a multi-carrier wireless communication. The main advantage of a OFDM system is the low complexity of the frequency domain equalization. This is usually implemented with the introduction of a cyclic prefix, which is able to cope with time dispersive channels, as long as the channel impulse response is shorter than the cyclic prefix.

A similar approach using a frequency domain equalizer can be adopted for a single carrier wireless system. A time domain cyclic prefix is used to cope with a multi-path fading channels and there is no inter-frame interference (or inter-block interference) if the channel impulse response is shorter than the cyclic prefix. The basic concept of a single carrier wireless system with a frequency domain equalizer is similar to a wireless OFDM system. The main difference is that the frequency domain equalizer of a single carrier wireless system has an inverse fast Fourier transformation (IFFT) module or unit located at its output. One consequence is that the implementation of a minimum mean square error (MMSE) based channel equalizer is much more difficult in a single carrier wireless system than in a multicarrier OFDM system. In high rate single carrier wireless systems beyond 1 Gbps, since the number of ADC (analog digital converter) sample bits is limited, an analog AGC (automatic gain control) is typically placed before the high speed ADC in order to guarantee the input signal range is aligned with the dynamic range of the ADC. For burst type wireless communications like IEEE802.11n or IEEE802.15.3c based wireless systems, an analog AGC has several dB error due to the limited time/period used for the AGC converge. The AGC control error is not sensitive to the multiplication based operations but very sensitive to the divider based operations, like in an MMSE equalizer. An MMSE equalizer must cope with the AGC control error and the dynamic variation of the input signal level. As a result, the number of input bit width and the resolution requirement of the divider is large and the complexity of a MMSE equalizer is high since it grows exponentially with the input bit width. FIG. 1 shows a schematic example of a frame structure for a single carrier wireless system with a frequency domain equalizer. The frame structure as shown in FIG. 1 comprises a synchronization part which is followed by a start frame delimit (SFD), which is followed by a channel estimation sequence (CES), which is then followed by data blocks. The synchronization part is used in the receiver for automatic gain control (AGC) and coarse frame timing. The SFD indicates the end of the synchronization sequence and the beginning of the channel estimation sequence. The channel estimation sequence comprises for example Golay sequences or other suitable sequences, and is used for channel estimation on the receiver side. The data blocks are for example separated by respective guard intervals.

Figure 2:
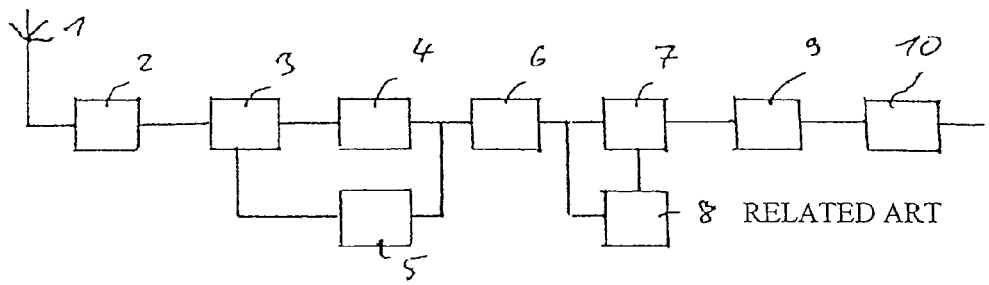

FIG. 2 shows a block diagram of an example of a typical receiver structure in a single carrier wireless communication system with a frequency domain equalizer. In the receiver structure shown in FIG. 2, wireless signals in the single carrier system are received by an antenna 1 and further processed in a receiving means 2, which for example down converts the received signals to the baseband. Then, the down converter signals are subjected to an automatic gain control in an automatic gain control means 3. The automatic gain control means 3 performs an analog processing. As mentioned above, analog automatic gain processing normally has several dB error. Thereafter, the gain control signals are subjected to an analog to digital conversion in an analog to digital conversion means 4. Thereafter, the synchronization part of a received frame is evaluated and processed in an AGC control means 5 which controls an automatic gain control means 3 in order to set and adjust the gain of the received signals. Further, the digital signals from the analog digital conversion means 4 are subjected to a fast Fourier transformation (FFT) in a FFT means 6, whereafter the frequency domain signals are subjected to an equalization in the equalizer 7 (which is for example an MMSE equalizer). Hereby, after the fast Fourier transformation, the channel estimation sequence is processed by a channel estimator 8 which estimates the channel characteristics and provides the equalizer 7 with necessary information in order to enable a correct equalization of the received signals. The output from the equalizer 7 is then subjected to an inverse fast Fourier transformation in an IFFT means 9, whereafter the succeeding processing steps, such as a demodulation in a demodulation means 10 and so forth follow.

The following discussion assumes that the equalizer 7 is a standard single tap MMSE equalizer which equalizes the received signal by multiplying the received signal with a complex number g. For systems which are performing equalization in the frequency domain, a separate single tap equalizer is needed for each carrier or frequency 1. The equalization method for each carrier or frequency can then be defined by $$g_l = \frac{h_l^*}{|h_l|^2 + \sigma_n^2},$$

whereby $h_l$ represents the channel response for the carrier or frequency 1 which is estimated based on the channel estimation part and $\sigma_n^2$ represents the noise variance. The noise variance is equivalent to 1/SNR (signal to noise ratio). In order to perform the division operation for this standard equalizer, a large look-up table is needed, since the dynamic range of $1/(|h_l|^2+\sigma_n^2)$ for a wide range of noise variance and different channel powers can be very large. In addition, as visualized in FIG. 3, the AGC control means 5 introduces several dB control error due to the limited AGC training period. Particularly in burst type signals, only a short time period is available for the automatic gain control. Since the divider of the MMSE equalizer is very sensitive to the error of an input signal (as compared to a multiplication), the performance of an MMSE based single carrier frequency domain equalizer is largely degraded. It can be seen in FIG. 3 that a small variation of $1/(|h_l|^2+\sigma_n^2)$ results in a large difference in the output of the divider.

The object of the present invention is therefore to suggest a receiving apparatus and a receiving apparatus for receiving signals in a wireless communication system with in which the performance of the equalization is improved in a simple but effective manner.

The above object is achieved by a receiving apparatus according to claim 1. Claim 1 defines a receiving apparatus for receiving signals in a wireless communication system, in which the signals comprise a dedicated channel estimation sequence, and wherein the receiving apparatus comprises a gain control means adapted to control the gain of a received signal, a channel estimation means adapted to perform a channel estimation on the basis of a dedicated channel estimation sequence comprised in a received signal, a gain error correction means adapted to correct a gain error in the result of the channel estimation caused by said gain control means on the basis of said dedicated channel estimation sequence comprised in the received signal, and an equalizing means adapted to perform an equalization on the received signal on the basis of the gain corrected channel estimation result.

The above object is further achieved by a receiving method for receiving signals in a wireless communication system, in which the signals comprise a dedicated channel estimation sequence, according to claim 8, comprising the steps of controlling the gain of a received signal, performing a channel estimation on the basis of a dedicated channel estimation sequence comprised in a received signal, correcting a gain error in the result of said channel estimation caused by said gain controlling step on the basis of said dedicated channel estimation sequence comprised in the received signal, and performing an equalization on the received signal on the basis of the gain corrected channel estimation result.

The present invention thus suggests to use the channel estimation sequence not only for channel estimation, but also for a further correction of the AGC control error. Hereby, the accuracy of the input signal to the equalizer can be improved and the dynamic range/input bit width to the equalizer can be reduced, so that the performance of the equalizer is improved in a simple but effective manner.

Advantageous features are defined in the respective subclaims.

Advantageously, the gain error correction means comprises a gain error calculation means adapted to obtain a gain error of the dedicated channel estimation sequence comprised in the received signal and a correction means adapted to correct a gain error in the result of the channel estimation performed by the channel estimation means on the basis of the gain error obtained in the gain error calculation means. Hereby, the gain error calculation is advantageously adapted to obtain the gain error on the basis of a power calculation. Further, the correction means is advantageously adapted to normalize the result of the channel estimation on the basis of the result of said power calculation.

Further, advantageously, the gain error calculation means is adapted to obtain said gain error on the basis of a power calculation within a calculation period which corresponds to a guard interval period of guard intervals of said received signals.

Advantageously, the gain error calculation means is adapted to perform an automatic gain control error calculation on the basis of the channel estimation sequence output either from an analog-to-digital conversion means or a fast Fourier transformation means.

Further, advantageously, the gain error calculation means is adapted to obtain a gain error of said dedicated channel estimation sequence comprised in the received signal separately for each path in a multipath situation having a power above a predefined threshold. Hereby, the gain error calculation means is advantageously adapted to obtain the gain error by setting the power of each path having a power below a predefined threshold to zero.

Advantageously, the wireless communication system is a single carrier wireless system in which information is transmitted and received on a single frequency carrier. Further, advantageously, the equalizing means of the present invention is advantageously a frequency domain equalizing means e.g. an equalizing means having dividers, such as but not limited to a MMSE equalizer. Further, the receiving apparatus and the receiving method according to the present invention are advantageously adapted to operate in a single carrier wireless system which is suitable for the transmission and reception of high data rates, for example indoor system. Alternatively, the present invention could also be applicable in outdoor environments. Further, the present invention could also be implemented in a multi-carrier system in which information is transmitted and received on the basis of multiple frequency carriers, such as an OFDM system.

The present invention thus provides an advantageous possibility to improve the performance of an equalizer, and as (but not limited to) an MMSE equalizer, in a simple and effective way by normalizing (or reducing) the dynamic range of the input signals to the equalizer to a limited range so that the required bit width for the divider comprised in the equalizer is reduced.

It is to be noted that the receiving apparatus and the receiving method of the present invention can be implemented in any kind of device, unit, module and so forth. For example, the receiving apparatus could either be part of a stand-alone receiving apparatus or device or could be part of a transmitting and receiving apparatus or device or communication device. Further, all elements cited in the claims and described in the present specification named "means" could be implemented as any kind of module, unit, either having a single functionality or an combined functionality with other elements of the apparatus.

Figure 3:
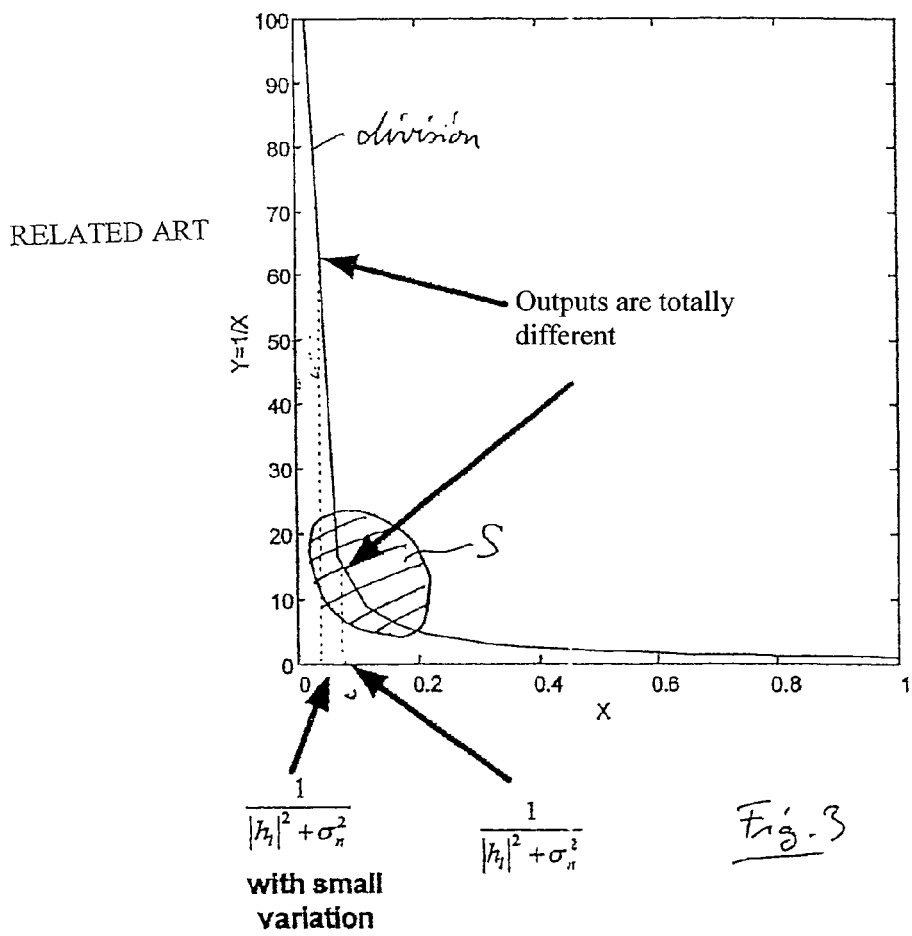
Figure 4:
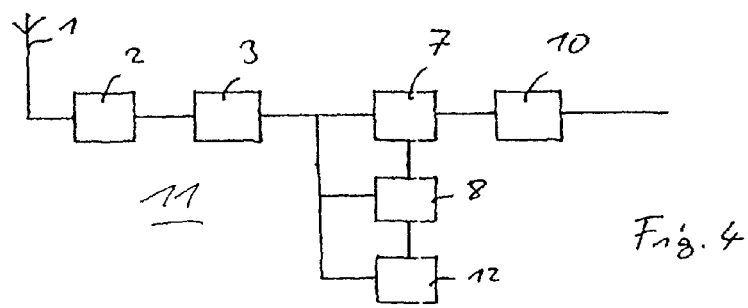
Figure 5:
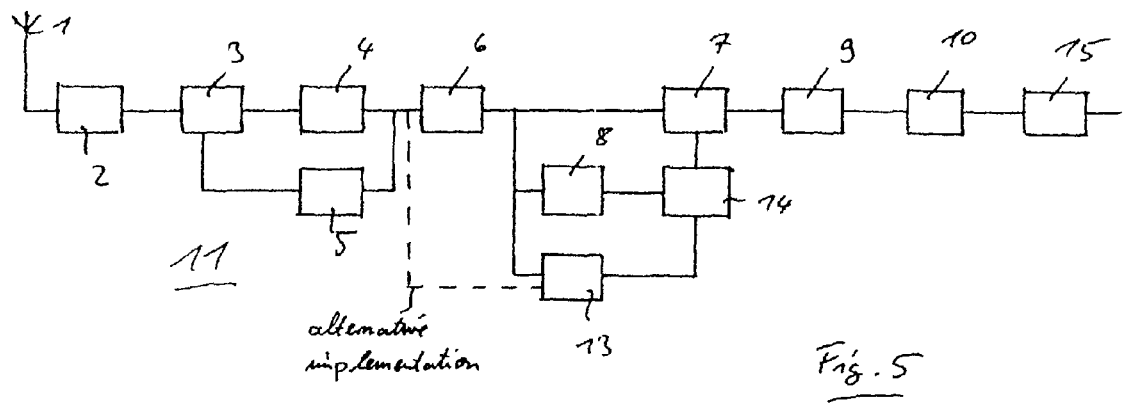

The present invention will be further explained in more detail on the basis of a preferred embodiment in relation to the enclosed drawings, in which FIG. 1 shows a frame of a single carrier wireless system, FIG. 2 shows a schematic block diagram of a receiving structure of a single carrier wireless system, FIG. 3 shows a schematic diagram visualizing the high sensitivity of a divider of an equalizer to an input variation, FIG. 4 shows a schematic block diagram of a receiving apparatus according to the present invention, and FIG. 5 shows the receiving apparatus shown in FIG. 4 in more detail.

FIG. 4 shows a schematic block diagram of a receiving apparatus 11 of the present invention, comprising an antenna 1 for receiving wireless signals in wireless communication system. The wireless communication system could be a single carrier wireless communication system or a multi-carrier wireless communication system. Throughout the present application, the same elements are designated with the same reference numerals.

The receiving apparatus 11 as shown in FIG. 4 is adapted to receive wireless signals via an antenna 1. The received signals are then forwarded to a receiving means 2, which is adapted to down convert the received signals to a baseband. The down converted signals are then processed in an automatic gain control means 3 which performs an automatic gain control on the received signals. Thereafter, an equalizing means 7 performs an equalization of the received signals on the basis of a result of a channel estimation performed by a channel estimator 8 on the basis of a channel estimation sequence comprised in the received signals. The received signals could for example have a frame structure as shown and explained in relation to FIG. 1. Further, according to the present invention, the receiving apparatus 11 comprises a gain error correction means 12 which is adapted to perform a gain error correction on the basis of a channel estimation sequence comprised in the received signals (the same channel estimation sequence which is used in the channel estimation means 8 to perform the channel estimation). Thus, the equalizing means 7 performs the equalization on the received signals on the basis of the gain corrected channel estimation result. The equalized signals are then demodulated in a demodulating means 10 which is adapted to demodulate or de-map the information according to the respective modulation scheme.

The present invention therefore suggests to use the channel estimation sequence of the frame structure of the transmitted and received signals not only for the channel estimation, but also for a further correction of the AGC control error. Since the channel estimation sequence normally has a large spreading gain, the several dB control error of the AGC control means (such as the AGC control means 5) could be estimated quite accurately by using matched filtering of parts of the channel estimation sequence and by a corresponding compensation for example by normalization or at other suitable correction of the result of the channel estimation before the channel estimation result is supplied to the equalizer, specifically, if the equalizer 7 is comprising dividers, or is a MMSE equalizer. As a result, the accuracy of the input signals to the equalizer 7 could be improved and the dynamic range or input and output bit width of the divider comprised in the equalizer 7 could be reduced. This is visualized by the shaded area S in FIG. 3, which shows an example of how the dynamic range could be reduced from the full range to a limited range of the area S, thus improving performance of the equalizer 7 significantly.

FIG. 5 shows a more detailed block diagram of the receiving apparatus 11 of the present invention. As shown in FIG. 5, after the automatic gain control performed by the automatic gain control means 3, an analog to digital conversion is performed by an analog to digital conversion means 4. The digital signals, more specifically the synchronization part of each frame of the received signals (cf. FIG. 1) is processed in an AGC control means 5 in order to adjust the AGC means 3. Further, the digitized signals from the analog to digital conversion means 4 are supplied to a fast Fourier transformation (FFT) means 6, which performs a transformation from the time domain to the frequency domain on the received signals. The channel estimation means 8 then performs the channel estimation on the basis of the channel estimation sequence comprised in the received signals in a suitable manner. At the same time, an AGC error calculation means 13 performs an AGC error calculation on the basis of the channel estimation sequence output from the FFT means. In an alternative implementation as shown by the dashed lines in FIG. 5, the AGC error calculation means 13 performs an AGC error calculation on the basis of the channel estimation sequence output from the ADC means 4. A result of the AGC error calculation performed in the means 13 is then supported to an error correction means 14, which is adapted to correct the gain error in the result of the channel estimation performed by the channel estimation 8, whereafter the gain corrected channel estimation result is supplied to the equalizer 7. The equalized signals output from the equalizer 7 are then subjected to an inverse fast Fourier transformation in an IFFT means 9, transforms the signal from the frequency domain to the time domain and outputs the signal to a demodulation means 10 which performs a demodulation on the signals, whereafter a channel decoding means 15 performs a channel decoding on the demodulated data.

The AGC error calculation means 13 and the error correction means 14 therefore form the gain error correction means 12 as shown in FIG. 4. The AGC error calculation means 13 is adapted to obtain the gain error on the basis of a power calculation based on the channel estimation sequence contained in the received signals. Further, the AGC error calculation means 13 is adapted to obtain the gain error on the basis of the summary of each wireless path (in an multipath environment) above a predefined threshold on the basis of the channel estimation sequence. Hereby, the power of a wireless path which is lower than a predefined threshold could be set to zero in order to reduce the noise. The gain error calculation means 13 is adapted to obtain the gain error on the basis of a power calculation of the channel estimation sequence within a calculation period corresponds to a guard interval period of guard intervals comprised in transmitted and received signal. The power calculation performed in the AGC error calculation means 13 can for example be based on $I^2+Q^2$, or $|I|+|Q|$, or maximum $(|I|, |Q|)+½$ minimum $(|I|, |Q|)$, or maximum $(|I|, |Q|)+¼$ minimum $(|I|, |Q|)$ or any other suitable variation of power calculation, I and Q representing the I and the Q part of the output signal with the channel estimation sequence which is output by the FFT means 9 (or output from the ADC means 4 in the alternative implementation).

The error correction means 14 is adapted to perform a normalization on the channel estimation result on the basis of the power calculation by the AGC error calculation means 13. Hereby, the correction and normalization of the channel estimation result is conducted in order to reduce the number of the required input bit width of the equalizer 7 as much as possible. Particularly, in case that the equalizer 7 comprises one or more dividers, the look-up tables of the dividers grow exponentially with the number of the input bit width, so that the complexity and the size of the required look-up tables could be reduced largerly. It has to be understood, that the equalizer 7 could be any type of equalizer using a divider operation. Further, the equalizer 7 could be MMSE equalizer or any other suitable type of equalizer.

As mentioned, the present invention could be applied to single carrier wireless systems or multi-carrier wireless systems. However, advantages of a single carrier wireless system over a multi-carrier wireless system is that the energy of individual symbols is transmitted over the whole available frequency spectrum. Therefore, narrow band notches within the channel transfer function have only a small impact on the performance. In multi-carrier systems, narrow band notches would degrade the performance of the transmitted symbols assigned over the relevant subcarriers, although the diversity can be regained partly by utilizing error control decoding with some performance loss. A further advantage of single carrier wireless systems is a low peek to average ratio for the radiated signal, which makes the power amplifier in the transmitter more efficient and cheaper, especially for wireless systems operating in the millimeter wave range. Further advantage of single carrier wireless systems is that they are robust to the effect of phase noise, which makes the local oscillators simpler, especially for millimeter wave systems. Further, the number of ADC bits in the receiver can be reduced which is critical for high data rate communication. Further, the carrier frequency error between the transmitter side and the receiver side can destroy the orthogonality between subcarriers and introduce the inter-subcarrier interference in multi-carrier systems. However, this has no effect of single carrier systems with a frequency domain equalizer. Further, single carrier wireless systems are more suitable for scenarios in which the transmitter side is simple and should have a low power consumption and the receiver side is more complex or has a relatively high power consumption like in high definition television.

The main advantages of the present invention are that the performance of the equalizer 7 especially in case of single carrier domain equalizer is improved. Further, the accuracy of the input signal to the equalizer, specifically two dividers comprised in the equalizer, could be improved. Further, the required bit width for the look-up table used to realize dividers in the equalizer could be reduced, thus the complexity of the look-up tables could be degreased. Further, the AGC training period or overhead for a first type wireless communication could be reduced. Additionally, the single carrier frequency domain equalization could be more robust or varying wireless channels.

The invention claimed is:

1. A receiving apparatus for receiving signals in a communication system, in which the signals comprise a dedicated channel estimation sequence, comprising processing circuitry including:
    a gain control circuitry portion that controls gain of a received signal,
    a channel estimation circuitry portion that performs a channel estimation on the basis of the dedicated channel estimation sequence in the received signal,
    a gain error correction circuitry portion that corrects a gain error in a result of the channel estimation of said gain control circuitry portion on the basis of said dedicated channel estimation sequence in the received signal, and
    an equalizing circuitry portion that performs an equalization on the received signal on the basis of the gain corrected channel estimation result.

2. The receiving apparatus according to claim 1, wherein said gain error correction circuitry portion includes a gain error calculation circuitry portion that obtains a gain error of said dedicated channel estimation sequence in the received signal, and a correction circuitry portion that corrects a gain error in the result of the channel estimation performed by said channel estimation circuitry portion on the basis of the gain error obtained in said gain error calculation circuitry portion.

3. The receiving apparatus according to claim 2, wherein said gain error calculation circuitry portion obtains said gain error on the basis of a power calculation.

4. The receiving apparatus according to claim 3, wherein said gain error correction circuitry portion normalizes the result of the channel estimation on the basis of the result of said power calculation.

5. The receiving apparatus according to claim 2, wherein said gain error calculation circuitry portion obtains said gain error on the basis of a power calculation within a calculation period which corresponds to a guard interval period of guard intervals of said received signal.

6. The receiving apparatus according to claim 2, wherein said gain error calculation circuitry portion performs an automatic gain control error calculation on the basis of said dedicated channel estimation sequence output either from an analog to digital conversion circuitry portion or a fast Fourier transformation circuitry portion.

7. The receiving apparatus according to claim 2, wherein said gain error calculation circuitry portion obtains said gain error of said dedicated channel estimation sequence in the received signal separately for each path in a multi path situation having a power above a predefined threshold.

8. The receiving apparatus according to claim 7, wherein said gain error calculation circuitry portion obtains said gain error by setting the power of each path having a power below the predefined threshold to zero.

9. A receiving method for receiving signals in a communication system, in which the signals comprise a dedicated channel estimation sequence, comprising:
    controlling gain of a received signal;
    performing a channel estimation on the basis of a dedicated channel estimation sequence in the received signal;
    correcting a gain error in a result of said channel estimation caused by said gain controlling on the basis of said dedicated channel estimation sequence in the received signal, and
    performing an equalization on the received signal on the basis of the gain corrected channel estimation result.

10. The receiving method according to claim 9, wherein said gain error correction includes:
    calculating a gain error of said dedicated channel estimation sequence in the received signal; and
    correcting a gain error in the result of the channel estimation performed by said channel estimation on the basis of the gain error obtained in said gain error calculation.

11. The receiving method according to claim 10, wherein said gain error calculation obtains said gain error on the basis of a power calculation.

12. The receiving method according to claim 11, wherein said gain error correction normalizes the result of the channel estimation on the basis of the result of said power calculation.

13. The receiving method according to claim 11, wherein said gain error calculation obtains said gain error on the basis of a power calculation within a calculation period which corresponds to a guard interval period of guards intervals of said received signal.

14. The receiving method according to claim 9, wherein said gain error calculation automatically calculates the gain error on the basis of the channel estimation sequence output either from an analog to digital conversion or from a fast Fourier transformation.

15. The receiving method according to claim 11, wherein said gain error calculation obtains said gain error of said dedicated channel estimation sequence in the received signal separately for each path in a multi path situation having a power above a predefined threshold.

16. The receiving method according to claim 15, wherein said gain error calculation obtains said gain error by setting the power of each path having a power below the predefined threshold to zero.

* * * * *